US012145579B2

(12) United States Patent
Yasui

(10) Patent No.: US 12,145,579 B2
(45) Date of Patent: Nov. 19, 2024

(54) DRIVING SUPPORT APPARATUS, CONTROL METHOD OF VEHICLE, AND NON-TRANSITORY COMPUTER-READABLE STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/242,205

(22) Filed: Sep. 5, 2023

(65) Prior Publication Data

US 2023/0415735 A1 Dec. 28, 2023

Related U.S. Application Data

(63) Continuation of application No. 16/943,100, filed on Jul. 30, 2020.

(30) Foreign Application Priority Data

Aug. 8, 2019 (JP) .................................. 2019-146795

(51) Int. Cl.
*B60W 30/095* (2012.01)
*B60W 40/08* (2012.01)
*B60W 50/14* (2020.01)

(52) U.S. Cl.
CPC .......... *B60W 30/095* (2013.01); *B60W 40/08* (2013.01); *B60W 50/14* (2013.01);
(Continued)

(58) Field of Classification Search
CPC ............ B60W 60/0017; B60W 50/14; B60W 30/0956; B60W 30/095; B60W 40/08;
(Continued)

(56) References Cited

U.S. PATENT DOCUMENTS

| 7,693,627 B2 | 4/2010 | Natsume |
| 8,085,140 B2 | 12/2011 | Mochizuki et al. |

(Continued)

FOREIGN PATENT DOCUMENTS

| CN | 105083291 A | 11/2015 |
| CN | 109515430 A | 3/2019 |

(Continued)

OTHER PUBLICATIONS

Office Action for U.S. Appl. No. 16/943,100 mailed Nov. 21, 2023.
(Continued)

*Primary Examiner* — Jaime Figueroa
*Assistant Examiner* — Zachary Joseph Wallace
(74) *Attorney, Agent, or Firm* — Thomas | Horstemeyer, LLP

(57) ABSTRACT

A driving support apparatus in a vehicle, includes: an information acquisition unit configured to acquire peripheral information of the vehicle; a risk prediction unit configured to predict a risk region on the periphery of the vehicle using the peripheral information; a sight line specifying unit configured to specify a position of a sight line of a driver of the vehicle in the peripheral information; and a control unit configured to switch driving support control based on a degree of deviation between the risk region predicted by the risk prediction unit and the position of the sight line specified by the sight line specifying unit.

13 Claims, 11 Drawing Sheets

(52) U.S. Cl.
CPC . *B60W 2050/146* (2013.01); *B60W 2540/225* (2020.02); *B60W 2556/10* (2020.02)

(58) Field of Classification Search
CPC ....... B60W 2556/10; B60W 2540/225; B60W 2050/146; B60W 2050/143
See application file for complete search history.

(56) References Cited

U.S. PATENT DOCUMENTS

| | | | |
|---|---|---|---|
| 10,351,144 | B2 | 7/2019 | Yoshizu |
| 10,599,144 | B2 | 3/2020 | Zheng et al. |
| 10,620,627 | B2 | 4/2020 | Zheng et al. |
| 10,647,333 | B1 | 5/2020 | Donnelly et al. |
| 10,710,590 | B2 | 7/2020 | Zheng et al. |
| 10,717,439 | B2 | 7/2020 | Miura et al. |
| 10,723,358 | B2 | 7/2020 | Zheng et al. |
| 10,746,987 | B2 | 8/2020 | Lewis |
| 10,864,920 | B1 | 12/2020 | Donnelly et al. |
| 11,249,544 | B2 | 2/2022 | Sicconi et al. |
| 11,325,472 | B2 | 5/2022 | Nishiyori et al. |
| 11,511,752 | B2 | 11/2022 | Zheng et al. |
| 11,597,390 | B2 | 3/2023 | Zheng et al. |
| 11,609,566 | B2 | 3/2023 | Zheng et al. |
| 2008/0172151 | A1 | 7/2008 | Natsume |
| 2009/0303078 | A1 | 12/2009 | Mochizuki et al. |
| 2016/0096529 | A1 | 4/2016 | Davidsson et al. |
| 2018/0154905 | A1 | 6/2018 | Yoshizu |
| 2019/0084564 | A1 | 3/2019 | Miura et al. |
| 2019/0184997 | A1 | 6/2019 | Zheng et al. |
| 2019/0184998 | A1 | 6/2019 | Zheng et al. |
| 2019/0187700 | A1 | 6/2019 | Zheng et al. |
| 2019/0187701 | A1 | 6/2019 | Zheng et al. |
| 2019/0213429 | A1* | 7/2019 | Sicconi .................. G06F 3/012 |
| 2019/0308554 | A1 | 10/2019 | Tsukao et al. |
| 2020/0018952 | A1 | 1/2020 | Lewis |
| 2020/0057487 | A1 | 2/2020 | Sicconi et al. |
| 2020/0192360 | A1 | 6/2020 | Zheng et al. |
| 2020/0324769 | A1 | 10/2020 | Zheng et al. |
| 2020/0353926 | A1 | 11/2020 | Zheng et al. |
| 2021/0001723 | A1 | 1/2021 | Nishiyori et al. |
| 2021/0016805 | A1 | 1/2021 | Oba et al. |
| 2021/0094820 | A1 | 4/2021 | Donnelly et al. |
| 2021/0129748 | A1 | 5/2021 | Tamrakar et al. |
| 2022/0164026 | A1 | 5/2022 | Sicconi et al. |
| 2022/0169257 | A1 | 6/2022 | Kikuta et al. |
| 2022/0262236 | A1 | 8/2022 | Ueno et al. |

FOREIGN PATENT DOCUMENTS

| | | |
|---|---|---|
| EP | 3002740 A1 | 4/2016 |
| JP | H07-167668 A | 7/1995 |
| JP | 2008168845 A | 7/2008 |
| JP | 2008-230296 A | 10/2008 |
| JP | 2018097398 A | 6/2018 |
| WO | 2008/029802 A1 | 3/2008 |

OTHER PUBLICATIONS

Japanese Office Action for Japanese Patent Application No. 2019-146795 mailed Jun. 3, 2022 (partially translated).
Chinese Office Action for Chinese Patent Application No. 202010766801.4 mailed Jul. 8, 2023.
Non-Final Office Action for U.S. Appl. No. 16/943,100 mailed Jun. 20, 2022.
Response to Non-Final Office Action for U.S. Appl. No. No. 16/943,100 filed Sep. 20, 2022.
Final Office Action for U.S. Appl. No. 16/943,100 mailed Dec. 6, 2022.
Response to Final Office Action & AFCP 2.0 for U.S. Appl. No. 16/943,100 filed Feb. 6, 2023.
Advisory Action for U.S. Appl. No. 16/943,100 mailed Mar. 6, 2023.
RCE for U.S. Appl. No. 16/943,100 filed Mar. 13, 2023.
Non-Final Office Action for U.S. Appl. No. 16/943,100 mailed Mar. 28, 2023.
Response to Non-Final Office Action for U.S. Appl. No. 16/943,100 filed Jun. 28, 2023.
Final Office Action for U.S. Appl. No. 16/943,100 mailed Jul. 28, 2023.

* cited by examiner

BICYCLE AVOIDING PARKING VEHICLE

NOTIFICATION EXAMPLE
"THAT GUY ON THE BICYCLE IS RIDING STRANGELY ISN'T HE?"

NOTIFICATION EXAMPLE
"PLEASE BE CAREFUL OF THE BICYCLE ON THE LEFT"

BICYCLE MOVES INTO LANE TO AVOID PEDESTRIAN

NOTIFICATION EXAMPLE
"IT'S NOT GOOD TO GO THAT FAST ON THE SIDEWALK"
"RUSHING ABOUT ON HIS BICYCLE - HE MUST HAVE OVERSLEPT OR SOMETHING"

NOTIFICATION EXAMPLE
"PLEASE BE CAREFUL OF THE BICYCLE ON THE LEFT"

PEDESTRIAN JUMPS OUT FROM BETWEEN STOPPED VEHICLES

NOTIFICATION EXAMPLE
"EVERY MORNING THERE IS A TRAFFIC JAM IN THE OPPOSITE LANE HERE"
"THERE ARE TRUCKS FROM THE EARLY MORNING"

SIGHT LINE CHANGE

NOTIFICATION EXAMPLE
"THERE IS A PEDESTRIAN BEHIND THE STOPPED VEHICLE IN THE OPPOSITE LANE"
"THEY MAY JUMP OUT"

SIGHT LINE CHANGE

DRIVING SUPPORT APPARATUS, CONTROL METHOD OF VEHICLE, AND NON-TRANSITORY COMPUTER-READABLE STORAGE MEDIUM

CROSS-REFERENCE TO RELATED APPLICATION(S)

This application is a continuation application of U.S. application Ser. No. 16/943,100, filed Jul. 30, 2020, which claims priority to, and the benefit of, Japanese Patent Application No. 2019-146795 filed on Aug. 8, 2019, where the entire disclosure of both of the above applications are incorporated herein by reference.

BACKGROUND OF THE INVENTION

Field of the Invention

The present invention relates to a control technique of a vehicle.

Description of the Related Art

In driving support control of a vehicle, there is known control of automatically executing various traveling functions. For example, it is known to perform appropriate driving support or a notification to a driver in accordance with the state of the driver.

Japanese Patent Laid-Open No. 2008-168845 describes appropriately notifying a steering state in accordance with the steering situation of wheels by a driver when parking/stopping a vehicle. Japanese Patent Laid-Open No. 2018-97398 describes detecting the sight line of a driver and estimating a feature of the detected sight line.

On the vehicle side, when providing driving support control, some drivers want to avoid excessive notifications and driving support.

SUMMARY OF THE INVENTION

It is an object of the present invention to perform appropriate driving support control for a driver in consideration of the sight line of the driver and the peripheral environment of a road during traveling.

According to an aspect of the present invention, there is provided a driving support apparatus in a vehicle, comprising: an information acquisition unit configured to acquire peripheral information of the vehicle; a risk prediction unit configured to predict a risk region on the periphery of the vehicle using the peripheral information; a sight line specifying unit configured to specify a position of a sight line of a driver of the vehicle in the peripheral information; and a control unit configured to switch driving support control based on a degree of deviation between the risk region predicted by the risk prediction unit and the position of the sight line specified by the sight line specifying unit.

Further features of the present invention will become apparent from the following description of exemplary embodiments (with reference to the attached drawings).

DESCRIPTION OF THE EMBODIMENTS

Figure 1:
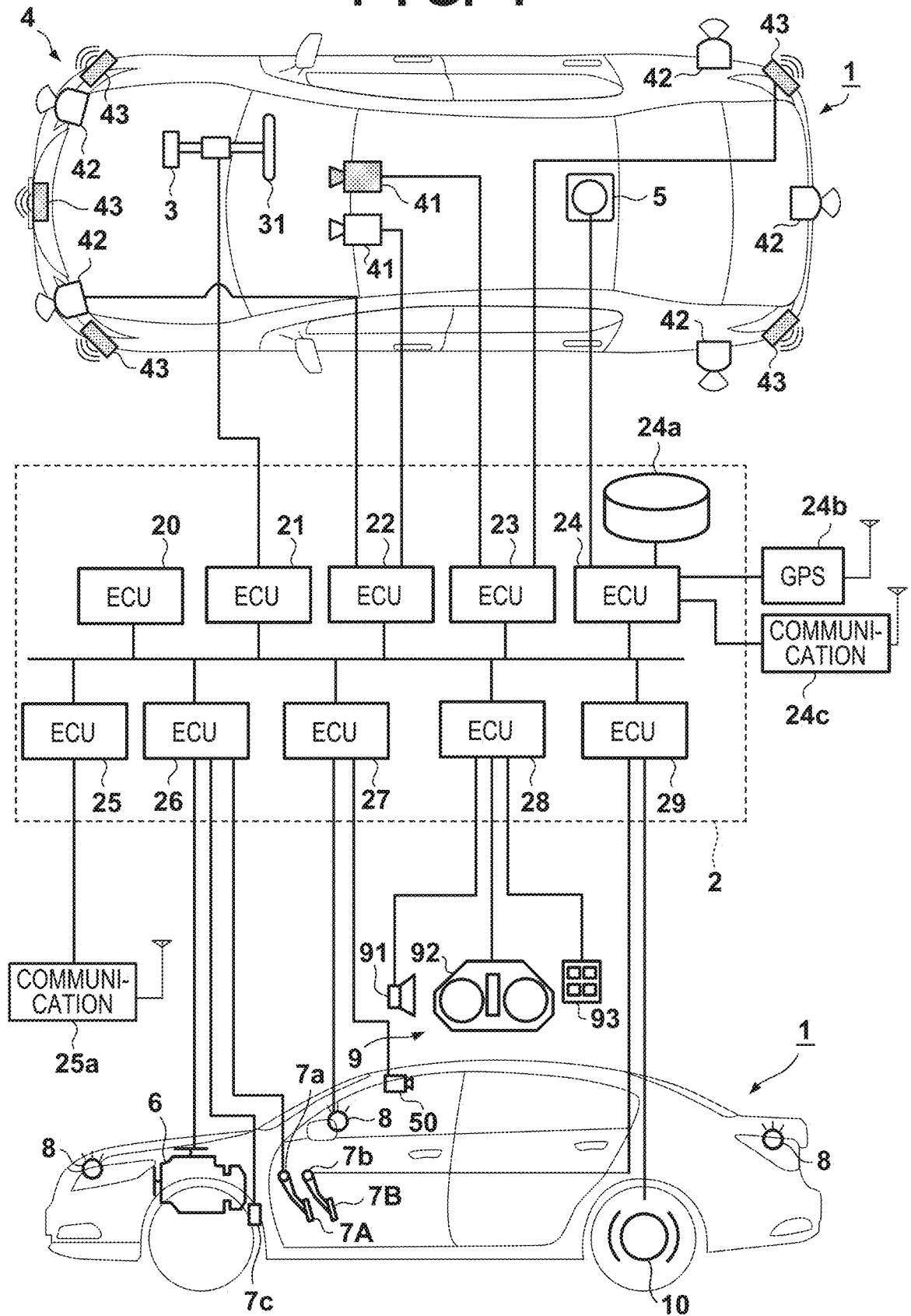
FIG. 1 is a block diagram of a vehicle control apparatus according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

[Vehicle Arrangement]

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

A vehicle control apparatus of FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. Both steering and acceleration/deceleration are automatically controlled in the control example to be described later.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving or driving support, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LiDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LiDARs, and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice (words). A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving or driving support, the ECU 29 automatically controls the brake device 10 in correspondence with an instruction from the ECU 20 and controls deceleration and stop of the vehicle 1. The brake device 10 or the parking brake can also be operated to maintain the stopped state of the vehicle 1. In addition, if the transmission of the power plant 6 includes a parking lock mechanism, it can be operated to maintain the stopped state of the vehicle 1.

The vehicle 1 further includes an in-vehicle detection unit 50 which detects the state in the vehicle. Here, the in-vehicle detection unit 50 is formed by a camera serving as an image capturing unit, a weight sensor, a temperature detection sensor, and the like, and the type is not particularly limited. Note that the in-vehicle detection unit 50 may be provided for each seat provided in the vehicle 1, or may be provided by a single arrangement so that the whole interior of the vehicle can be overviewed or monitored.

[Examples of Control Functions]

The control functions of the vehicle 1 according to this embodiment include traveling-associated functions associated with the control of driving, braking, and steering of the vehicle 1, and notification functions associated with the notification of information to the driver.

Examples of traveling-associated functions are lane maintenance control, lane departure suppression control (road departure suppression control), lane change control, preceding vehicle following control, collision reduction brake control, and erroneous start suppression control. Examples of the notification functions are adjacent vehicle notification control and preceding vehicle start notification control. As a kind of notification function, a conversation service by a voice with an occupant may be provided. In this conversation service, voice input from an occupant (driver or the like) may be recognized, and information may be provided as a response. Alternatively, the system side may proactively provide information by a voice.

Lane maintenance control is one of control processes for the position of the vehicle with respect to a lane, and makes the vehicle automatically travel (without depending on the driving operation of the driver) on the track of travel set on a lane. Lane departure suppression control is one of control processes for the position of the vehicle with respect to a lane. A white line or a median strip is detected, and steering is automatically performed so the vehicle does not go across the line. The function of the lane departure suppression control and the function of the lane maintenance control differ in this manner.

Lane change control is control of automatically moving the vehicle from the lane on which the vehicle is traveling to an adjacent lane. Preceding vehicle following control is control of automatically following another vehicle traveling in front of the self-vehicle. Collision reduction brake control is control of supporting collision avoidance by automatically braking the vehicle when the possibility of collision with an obstacle in front of the vehicle increases. Erroneous start suppression control is control of suppressing an abrupt start by limiting the acceleration of the vehicle in the stopped state of the vehicle when the acceleration operation by the driver is a predetermined amount or more.

Adjacent vehicle notification control is control of notifying the driver of the presence of another vehicle traveling on the adjacent lane which is adjacent to the travel lane of the self-vehicle. The driver is notified of, for example, the presence of another vehicle traveling on a lateral side or the rear side of the self-vehicle. Preceding vehicle start notification control is control of notifying the driver that another vehicle ahead has started when the self-vehicle and the other vehicle ahead are in a stopped state. These notifications can be made by the above-described in-vehicle notification devices.

The outline of processing according to this embodiment will be described below. In this embodiment, peripheral information and the information of the driver are acquired based on information acquired via the in-vehicle detection unit 50 and various kinds of detection units provided in the vehicle 1. Then, an appropriate information notification to the driver is made based on the acquired information.

[Potential Risk Prediction]

The control unit 2 acquires peripheral information of the vehicle 1 via the various kinds of detection units. FIG. 2A shows an example of an image on the front side in the traveling direction, which is acquired by performing image acquisition by the detection unit (camera 41) in the vehicle 1 during traveling. A description will be made here assuming that the driver in the vehicle 1 can also visually recognize the same scene. In the example to be explained below, the front side in the traveling direction will be exemplified. However, an image in a lateral direction or rear direction of the vehicle 1 may also be used. In place of an image, peripheral information may be acquired by a LiDAR or a radar.

The vehicle 1 according to this embodiment predicts a potential risk on the periphery based on various kinds of information acquired by the detection units. For example, the image show in FIG. 2A includes a bicycle 201 and another vehicle 202 as traffic participants. In this case, the bicycle 201 may travel to avoid the other vehicle 202, as indicated by an arrow 203. In this embodiment, as shown in FIG. 2B, the behavior of the bicycle 201 is predicted, and a region 204 according to the likelihood is predicted as a region where a potential risk exists. FIG. 2B shows a region of higher likelihood in a darker color.

As the method of potential risk prediction here, for example, a prediction method using a learning model of machine learning such as deep learning can be applied. In the learning model here, learning for predicting the motion of a target included in each image is performed using a plurality of image data (data set). A detailed description of the learning method will be omitted here, and it is assumed that a known method can be applied. The learning method is not particularly limited, and a known method may be used. Here, as the learning data, continuous image data each including a target are used. When the learning data is used, a learned model according to this embodiment is generated. By applying the learned model to an image acquired in a vehicle under a certain circumstance, the behavior of a target included in the image is predicted, and a potential risk is predicted based on the behavior result. Note that to generate a learned model, a large load is applied. Hence, the model is generated in advance and held in a storage unit in the vehicle 1. Additionally, as the traffic participant detection method or image recognition method used in potential risk prediction as well, known methods can be applied, and a detailed description thereof will be omitted here. In addition, as the peripheral information acquisition unit, if data obtained by a LiDAR or a radar is used in place of an image, the above-described learning data is not an image but output data from the LiDAR or radar.

Figure 2C:
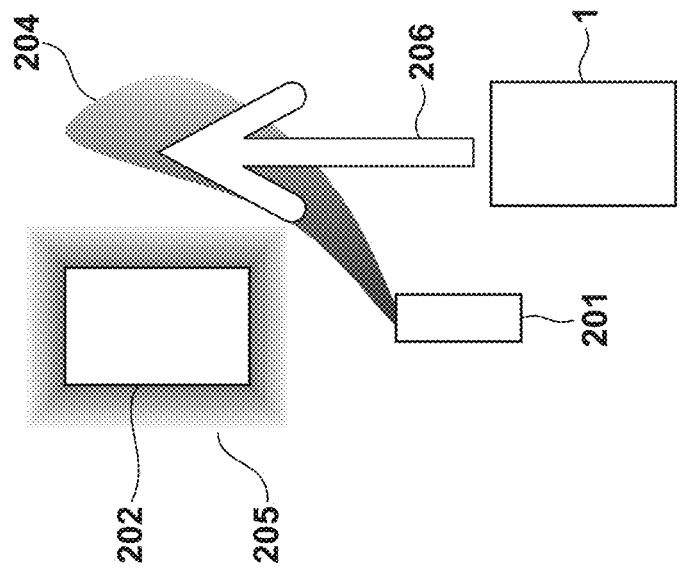
FIGS. 2A to 2C are views for explaining potential risk prediction according to an embodiment of the present invention.
Figure 2A:
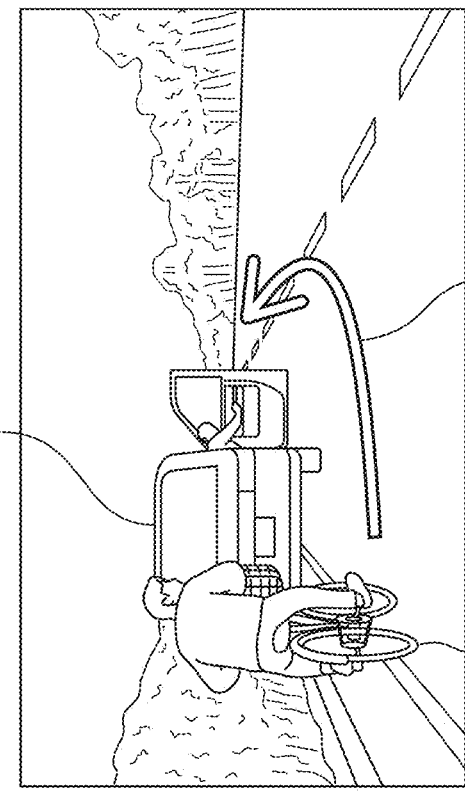
Figure 2B:
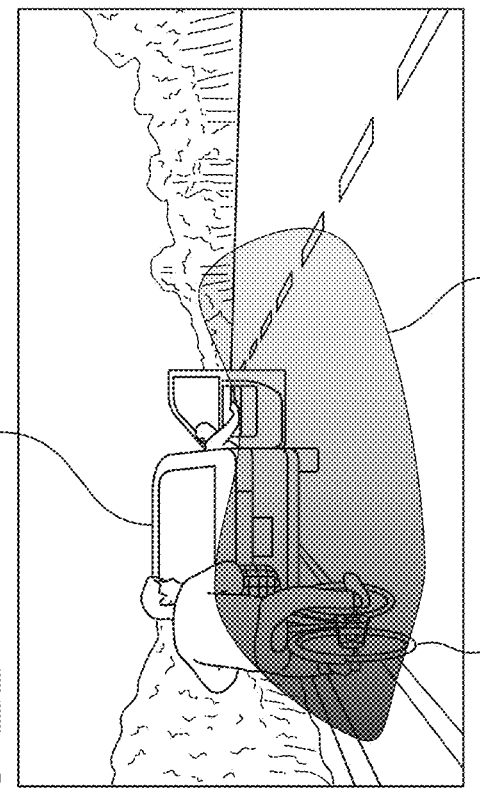

FIG. 2C is a conceptual view in a case in which FIGS. 2A and 2B are viewed from the upper side. While the vehicle 1 that is the self-vehicle is traveling in the advancing direction (arrow 206), the peripheral situation shown in FIG. 2A is detected. FIG. 2C shows a case in which the region 204 corresponding to behavior prediction of the bicycle 201 is superimposed in the advancing direction. Such a superimposed region is handled as a region of a high potential risk. Note that although not illustrated in FIGS. 2A and 2B, a region corresponding to the behavior of the other vehicle 202 may further be predicted, as indicated by a region 205 in FIG. 2C.

[Estimation of Gazing Point]

Figure 3A:
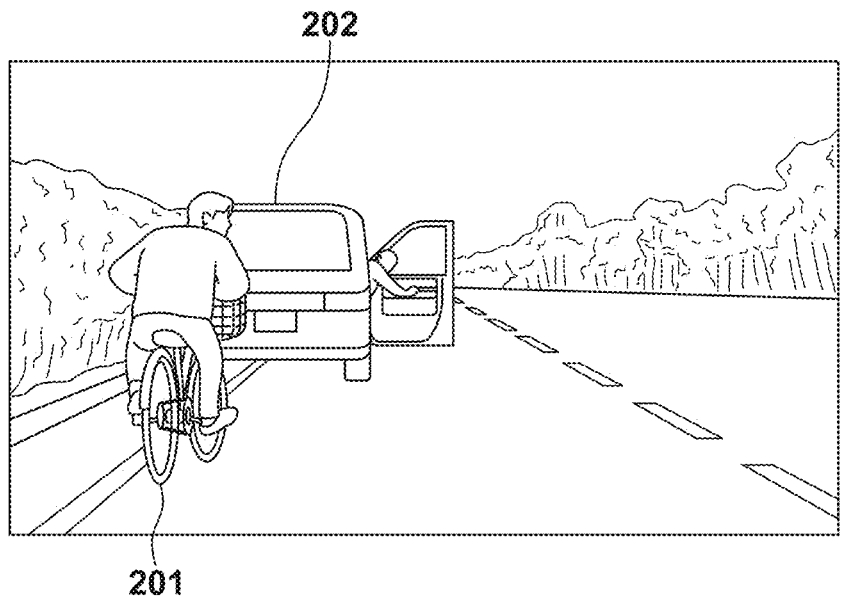
FIGS. 3A and 3B are views for explaining estimation of a gazing point of a skilled driver according to an embodiment of the present invention.
Figure 3B:
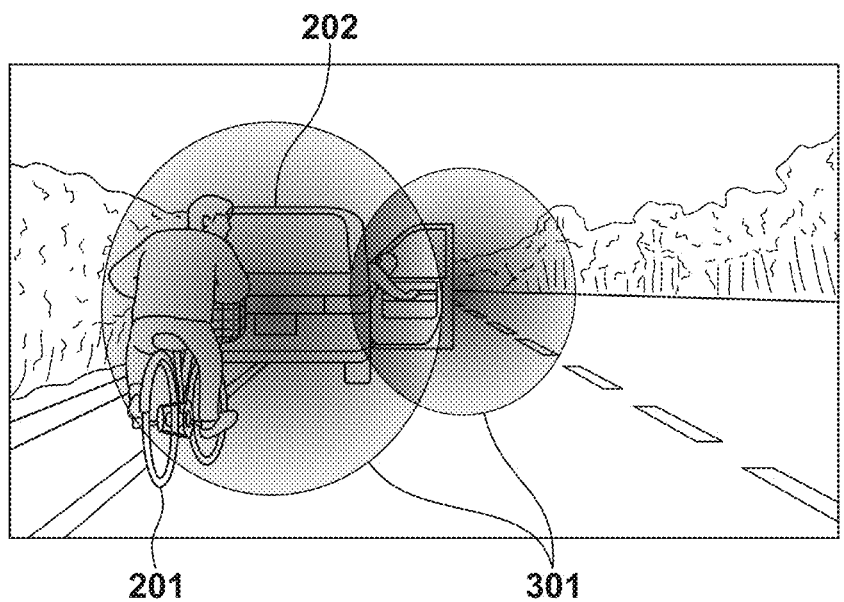

Gazing point estimation based on the operation data of a skilled driver according to this embodiment will be described next. FIG. 3A shows the same image as that shown in FIG. 2A. By applying a learned model generated and held in advance to the image, a region 301 is estimated by gazing point estimation as shown in FIG. 3B.

The learned model here is a model obtained by a machine learning method such as a CNN (Convolutional Neural Network) using the data of the driving history of a skilled driver. A detailed description of the learning method will be omitted here, and it is assumed that a known method can be applied. As the data of the driving history of the skilled driver, which is used here as learning data, a pair of an image (a front image of the vehicle or the like) acquired in the vehicle during traveling by the skilled driver and the position information of the sight line of the skilled driver for the image is used. That is, the learned model according to this embodiment is generated based on various kinds of targets (including traffic participants such as a vehicle and a person) located on the periphery of the self-vehicle included in the image and the position of the sight line of the skilled driver in a situation in which the presences of the targets are recognized. When the learned model is applied to an image of the vehicle in a certain situation, the position of the sight line of the skilled driver in the image is output. Note that to generate a learned model, a large load is applied. Hence, the model is generated in advance and held in a storage unit in the vehicle 1.

With the above-described processing, the position of the sight line of the skilled driver in a certain traveling situation is estimated. The position of the sight line is shown in the region 301. In this embodiment, the region 301 will be described as a "gazing point". Note that the gazing point is not limited to a point and may be indicated by a range in which the sight line moves at a predetermined time interval. Also, in this embodiment, the driver of data to be used to perform learning will be expressed as a "skilled driver". However, the attribute is not limited.

[Specifying of Sight Line of Driver]

Specifying of the sight line of the driver of the vehicle 1 according to this embodiment will be described next. As described above, the vehicle 1 further includes the in-vehicle detection unit 50 which detects the state in the vehicle. In this embodiment, a description will be made assuming that the directions of the sight line and the face of the driver are detected based on information such as an image acquired by the in-vehicle detection unit 50, and a description of other detection processes will be omitted.

Figure 4A:
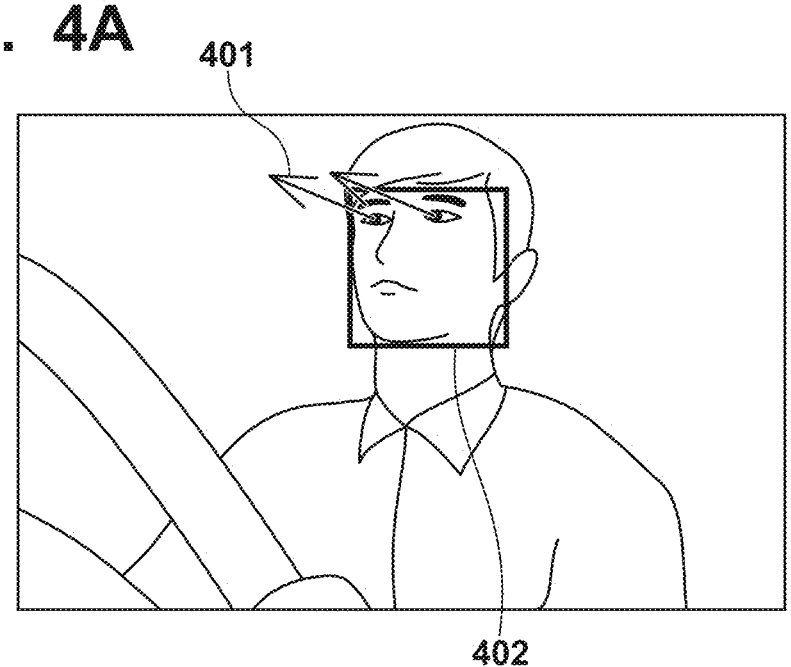
FIGS. 4A and 4B are views for explaining specifying of the sight line of a driver according to an embodiment of the present invention.

FIG. 4A shows an example of an image of the driver of the vehicle 1. In the image shown in FIG. 4A, a face region 402 is detected, and a sight line 401 of the driver is further detected. Note that the method of detecting the face region 402 or the sight line direction is not particularly limited, and a known method can be used. Also, the method is not limited to a method of detecting the sight line direction from one image or an image in one direction, and the sight line direction may be specified based on a plurality of images detected at the same timing by a plurality of in-vehicle detection units 50.

Figure 4B:
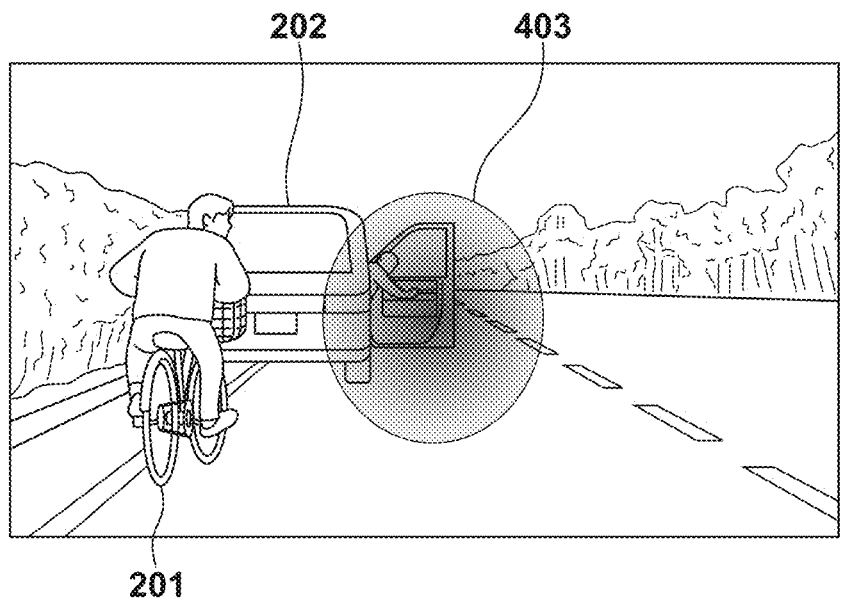

Based on the detected sight line direction of the driver, the position of the sight line of the driver in the peripheral image is specified. FIG. 4B shows a region 403 in which the position of the detected sight line of the driver in the image is specified. The image is the same as that shown in FIG. 3A. Note that since the sight line of the driver is not always constant, a range in which the sight line is located at a predetermined time interval may be used. The method of specifying the sight line direction and the method of specifying the position of the sight line in the image are not particularly limited, and a known method can be used.

[Processing Procedure]

The processing procedure of control processing according to this embodiment will be described with reference to FIG. 6. Each control process of this processing procedure is cooperatively performed by various kinds of ECUs and the like provided in the vehicle 1 as described above. To simplify the description, here, the main constituent of the processing is assumed to be the control unit 2 of the vehicle 1. For example, this processing may be started when the vehicle 1 starts traveling. In addition, this processing may continuously be repeated during traveling of the vehicle 1.

In step S601, the control unit 2 acquires a peripheral image of the vehicle 1 from the camera 41 that is a detection unit. Here, an image on the front side of the vehicle 1 in the advancing direction is acquired.

In step S602, the control unit 2 detects traffic participants from the image acquired in step S601. Examples of traffic participants are a person, another vehicle, and a moving body, and the types are not particularly limited. In the example of the image shown in FIG. 2A, the bicycle 201 and the other vehicle 202 are detected. Note that the detection contents here are not limited to plane information by the image, and the information of the relative distance or positional relationship between the self-vehicle and each traffic participant may also be detected.

In step S603, the control unit 2 performs behavior prediction for each traffic participant detected in step S602. Also, based on the result of behavior prediction, the control unit 2 predicts a potential risk on the periphery during traveling and specifies a region where the risk occurs. More specifically, the region 204 shown in FIG. 2B is predicted. The behavior prediction method and the potential risk prediction method are not particularly limited, and, for example, a known method as a risk prediction function in the automated driving field can be applied.

In step S604, the control unit 2 acquires information concerning the traveling state of the self-vehicle. Examples of the information concerning the traveling state are the information of the traveling speed, the acceleration/deceleration amount, and the advancing direction (steering angle).

In step S605, using the region of the potential risk predicted in step S603 and the information concerning the traveling state of the self-vehicle acquired in step S604, the control unit 2 determines whether the distance between the region of the potential risk and the traveling position of the self-vehicle is equal to or smaller than a predetermined threshold A. For example, as shown in FIG. 2C, it is determined whether the distance between the vehicle 1 and the region 204 or a region 205 is equal to or smaller than the threshold A. At this time, the position of the self-vehicle after a predetermined time may be predicted based on the information acquired in step S604, and the determination may be performed based on the prediction result and the positional relationship with the potential risk region. The threshold A is determined in advance and held in the storage unit of the vehicle 1. If it is determined that the distance is equal to or smaller than the threshold A (YES in step S605), the process advances to step S615. If it is determined that the distance is larger than the threshold A (NO in step S605), the process advances to step S606.

In step S606, using the region of the potential risk predicted in step S603 and the information concerning the traveling state of the self-vehicle acquired in step S604, the control unit 2 determines whether the distance between the region of the potential risk and the traveling position of the self-vehicle is equal to or larger than a predetermined threshold B. The relationship between the threshold A and the threshold B is given by threshold B>threshold A. Like the threshold A, the threshold B is also determined in advance and held in the storage unit of the vehicle 1. If it is determined that the distance is smaller than the threshold B (NO in step S606), the process advances to step S607. If it is determined that the distance is equal to or larger than the threshold B (YES in step S606), contents to be notified to the driver do not exist, and the processing procedure is ended.

In step S607, the control unit 2 applies a learned model generated in advance to the peripheral image acquired in step S601, thereby estimating a gazing point by a skilled driver. More specifically, as the processing result of this step, the region 301 as shown in FIG. 3B is output.

In step S608, the control unit 2 acquires an image of the driver of the vehicle 1 by the in-vehicle detection unit 50.

In step S609, the control unit 2 detects the sight line of the driver based on the image of the driver acquired in step S608. As the sight line detection method, a known method can be used, and the method is not particularly limited. In this step, more specifically, as shown in FIG. 4A, the face region of the driver is detected, and the direction of the sight line is detected.

In step S610, based on the sight line of the driver detected in step S609, the control unit 2 specifies the position of the sight line of the driver in the peripheral image acquired in step S601. The position of the sight line here may be specified as a range. In this step, more specifically, a region of a sight line position as indicated by the region 403 in FIG. 4B is specified.

Figure 5A:
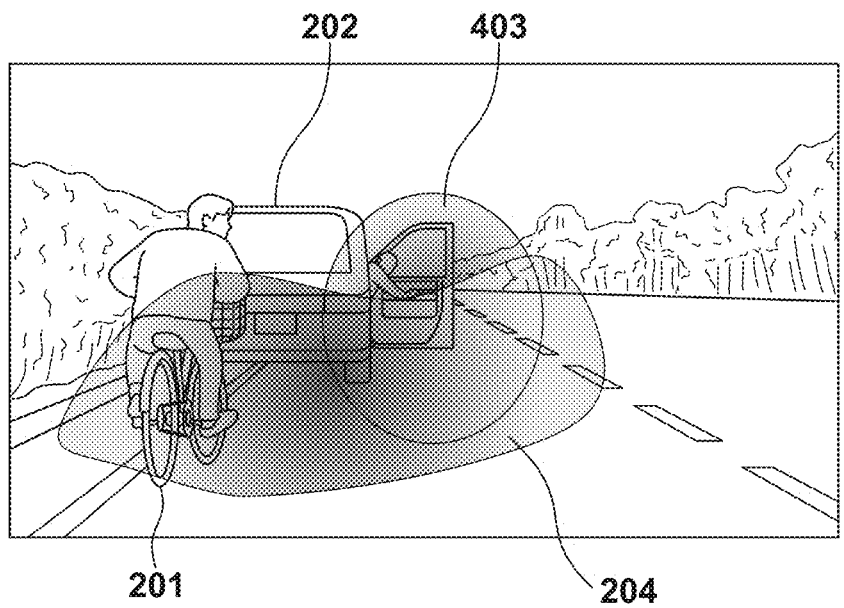
FIGS. 5A and 5B are views for explaining comparison processing according to an embodiment of the present invention.
Figure 5B:
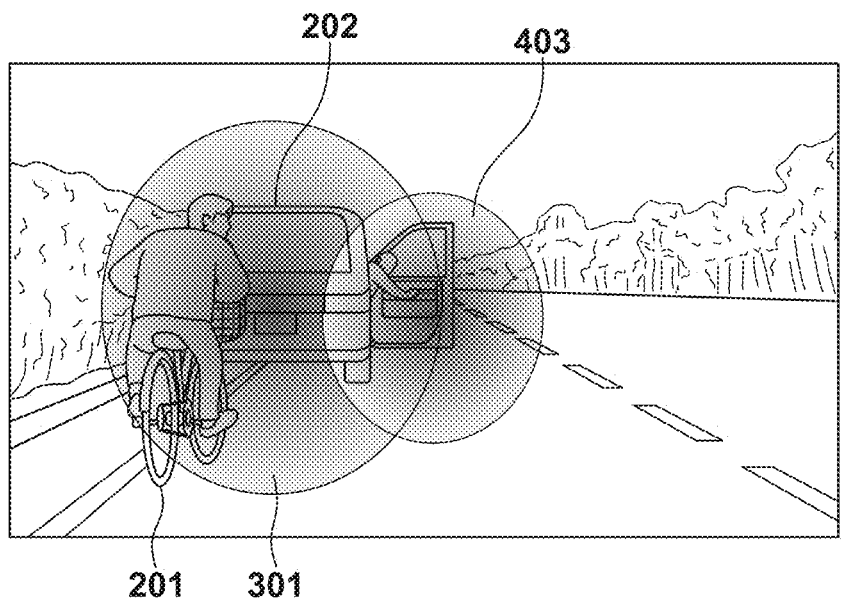

In step S611, the control unit 2 determines whether deviation which is the distance between the gazing point of the skilled driver estimated in step S607 and the sight line of the driver specified in step S610 in the embodiment is equal to or larger than a predetermined threshold C. More specifically, as shown in FIG. 5B, the distance between the region 301 and the region 403 is calculated, and the calculated distance and the threshold C are compared. The distance calculation method here is not particularly limited, and, for example, the shortest distance between the edges of the regions may be calculated, or the distance between the center points of the regions may be calculated. If the regions overlap, the distance may be handled as "0". The threshold C is determined in advance and held in the storage unit of the vehicle 1. If it is determined that the distance is equal to or larger than the threshold C (YES in step S611), the process advances to step S614. If it is determined that the distance is smaller than the threshold C (NO in step S611), the process advances to step S612.

In step S612, the control unit 2 determines whether the deviation which is the distance between the potential risk region predicted in step S603 and the sight line of the driver specified in step S610 in the embodiment is equal to or larger than a predetermined threshold D. More specifically, as shown in FIG. 5A, the distance between the region 204 and the region 403 is calculated, and the calculated distance and the threshold D are compared. The distance calculation method here is not particularly limited, and, for example, the shortest distance between the edges of the regions may be calculated. The threshold D is determined in advance and held in the storage unit of the vehicle 1. If it is determined that the distance is equal to or larger than the threshold D (YES in step S612), the process advances to step S614. If it is determined that the distance is smaller than the threshold D (NO in step S612), the process advances to step S613.

In step S613, the control unit 2 makes a notification to the driver by indirect guidance using a notification unit. A detailed example of indirect guidance according to this embodiment will be described later. Then, the processing procedure is ended.

In step S614, the control unit 2 makes a notification to the driver by direct guidance using a notification unit. A detailed example of direct guidance according to this embodiment will be described later. Then, the processing procedure is ended.

In step S615, the control unit 2 warns the driver that the possibility of risk occurrence is high because of the positional relationship between the self-vehicle and the potential risk region in the peripheral environment. A detailed example of warning according to this embodiment will be described later. Then, the processing procedure is ended.

Figure 6:
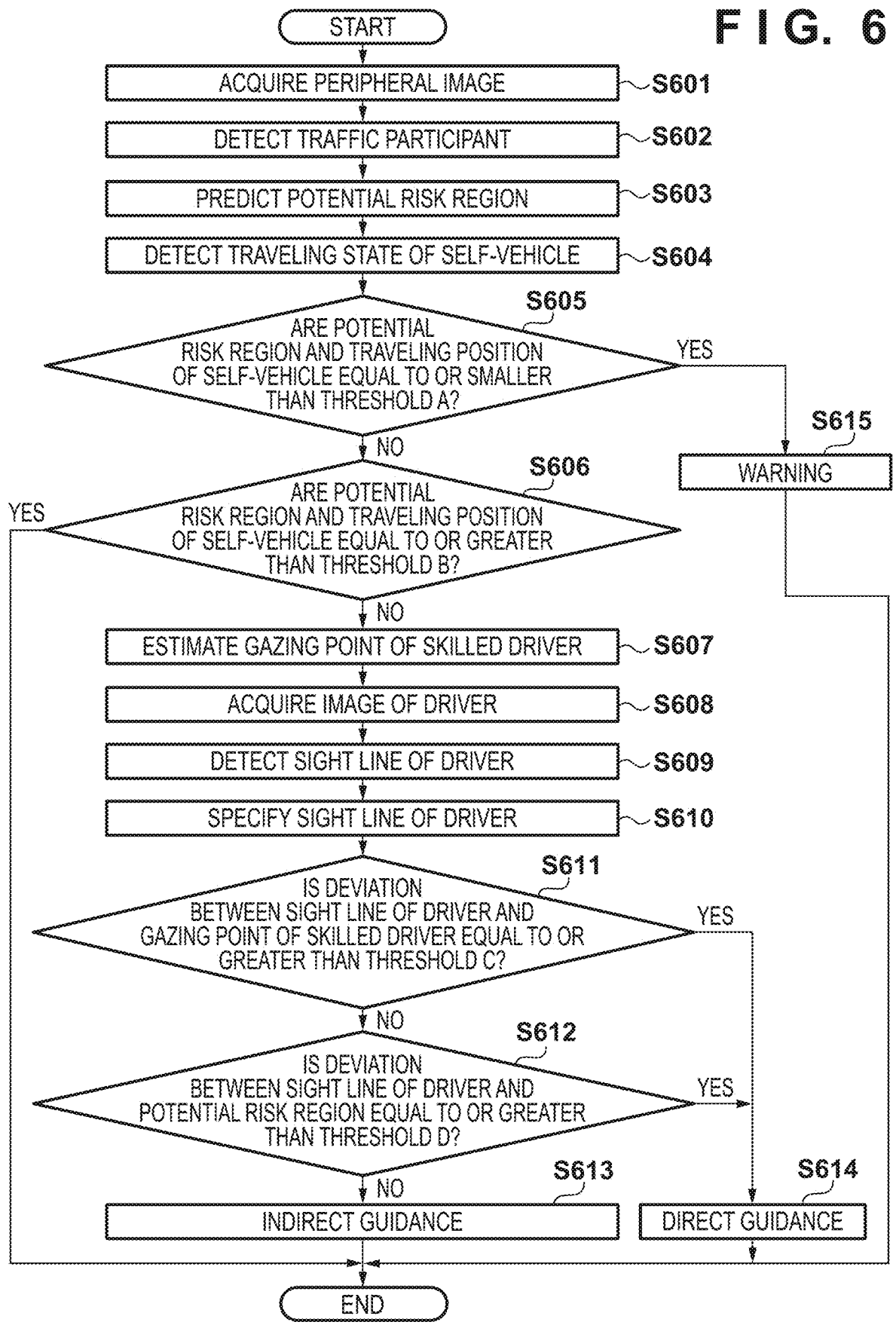
FIG. 6 is a flowchart of processing according to the first embodiment of the present invention.

Note that although a description will be omitted in FIG. 6, collision reduction and collision avoidance control may be performed in parallel. For example, a threshold A1 smaller than the threshold A is set. If the distance between the self-vehicle and a target on the periphery is smaller than the threshold A1, it may be judged that the possibility (collision possibility) of collision occurrence is high, and collision reduction brake control may be executed with priority over the warning in step S615. In addition, if the degree of urgency is high, it may be determined that collision cannot be avoided, and, for example, control may be performed to operate a collision safety device (airbag) or the like before the collision.

In addition, some of the processes shown in FIG. 6 may be performed in parallel. For example, the processes (steps S601 to S604) concerning peripheral information and the processes (steps S607 to S610) concerning the driver may be performed in parallel.

Note that in the above example, an image on the front side of the vehicle 1 in the advancing direction has been exemplified. However, the image is not limited to this. For example, an image on a lateral side of the vehicle at the time of a left turn or a right turn may be used. Alternatively, an image on a lateral side of the vehicle or on the rear side of the vehicle in advancing backward may be used. In place of an image, output data from the LiDAR or radar may be used.

[Notification Examples]

Direct guidance, indirect guidance, and warning according to this embodiment will be described next using detailed examples. Here, the guidance specifically aims at promoting to direct the sight line of the driver in a predetermined direction.

In the warning according to this embodiment, if it is determined that, for example, the possibility of occurrence of an event such as collision between the self-vehicle and a traffic participant is high to some extent, the driver is warned of it. As detailed contents, the position of a traffic participant close to the self-vehicle is directly notified.

The direct guidance according to this embodiment is performed if the possibility of occurrence of an event such as collision between the self-vehicle and a traffic participant is lower than in a case in which warning is performed, but the driver is caused to directly recognize the presence of the element (for example, the traffic participant) of the risk. Here, "direct" means, for example, specifically showing a position where the element of the risk exists. In this embodiment, the direct guidance is performed when the sight line of the driver is apart from the potential risk region or the region of the gazing point of the skilled driver by a predetermined distance or more.

The indirect guidance according to this embodiment is performed if the possibility of occurrence of an event such as collision between the self-vehicle and a traffic participant is lower than in a case in which warning is performed, but the driver is caused to indirectly recognize the presence of the element (for example, the traffic participant) of the risk. Here, "indirect" means, for example, showing an attribute (appearance, age, clothes, behavior, shape (truck or standard-sized vehicle), color, size, or the like) associated with the element of the risk or information concerning a target located on the periphery of the element of the risk. In this embodiment, the indirect guidance is performed when the sight line of the driver is located at a position within a predetermined distance from the potential risk region or the region of the gazing point of the skilled driver.

Figure 7A:
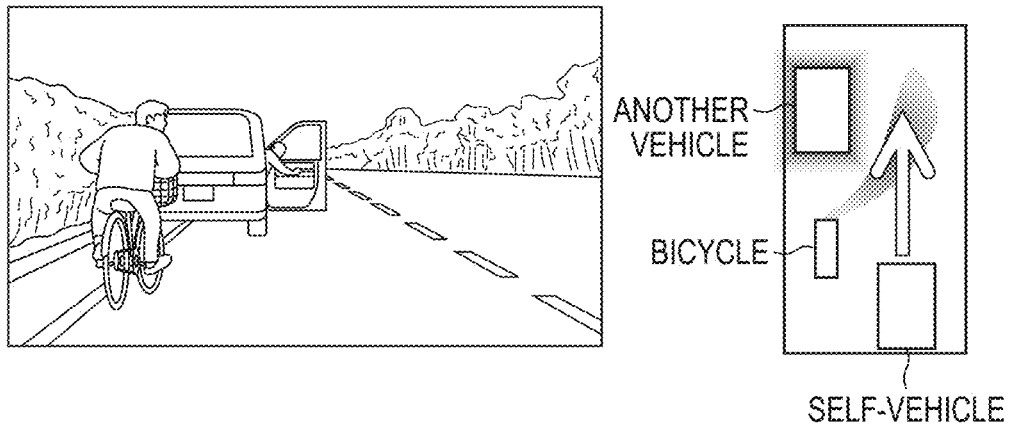
FIGS. 7A to 7C are views for explaining examples of direct guidance and indirect guidance according to an embodiment of the present invention.
Figure 7B:
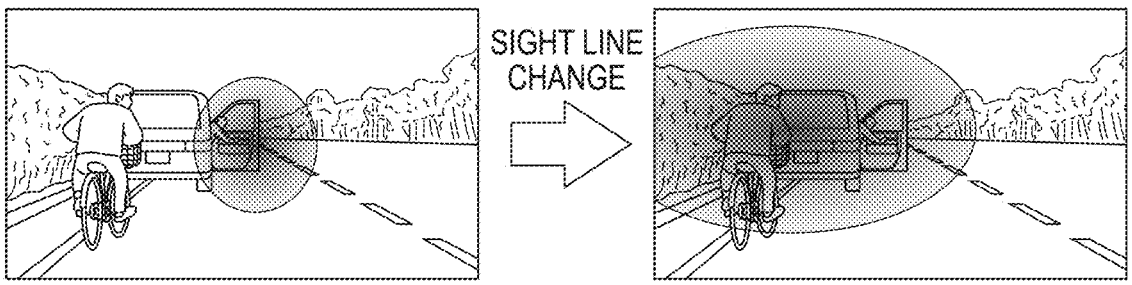
Figure 7C:
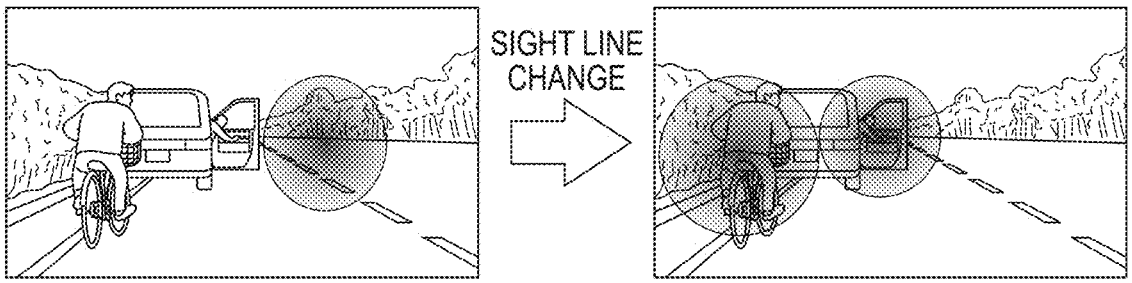

FIGS. 7A to 9C are views for explaining detailed examples of direct guidance and indirect guidance according to this embodiment. FIG. 7A shows a situation in which a bicycle predicted to avoid a parking vehicle exists on the front side of the self-vehicle, as in the peripheral image shown in FIG. 2A. FIG. 7B shows an example of a notification made when performing indirect guidance in this situation. This intends to change the sight line of the driver such that it includes the bicycle. FIG. 7C shows an example of a notification made when performing direct guidance. In this case, as compared to the sight line of the driver in FIG. 7B, the initial sight line is located at a position apart from the position of the bicycle.

Figure 8A:
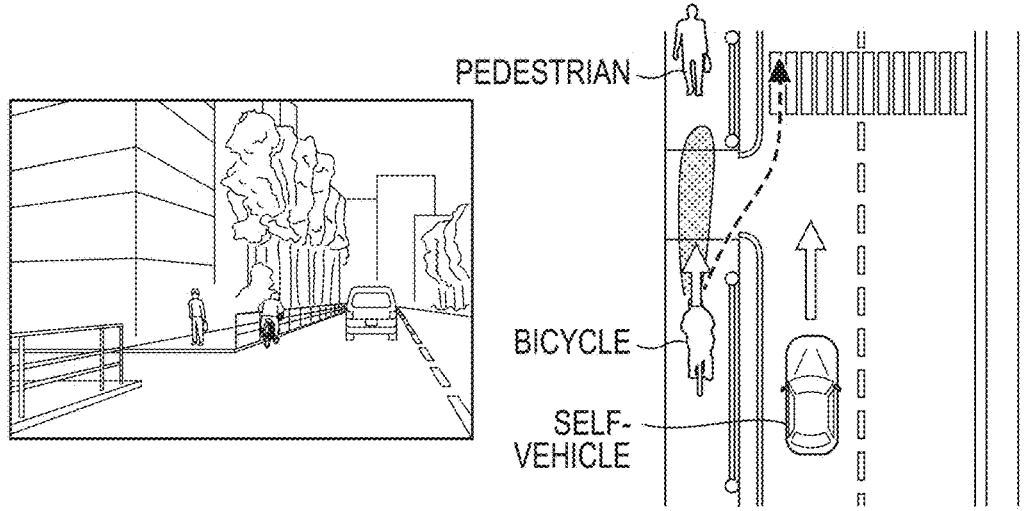
FIGS. 8A to 8C are views for explaining examples of direct guidance and indirect guidance according to an embodiment of the present invention.
Figure 8B:
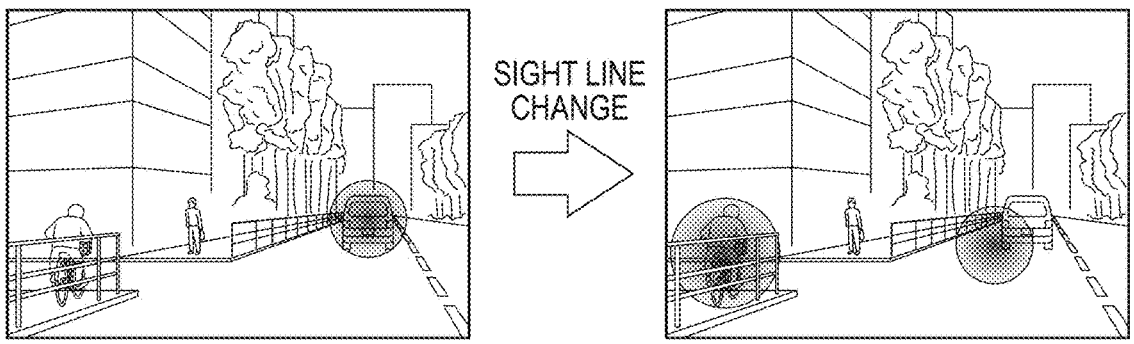
Figure 8C:
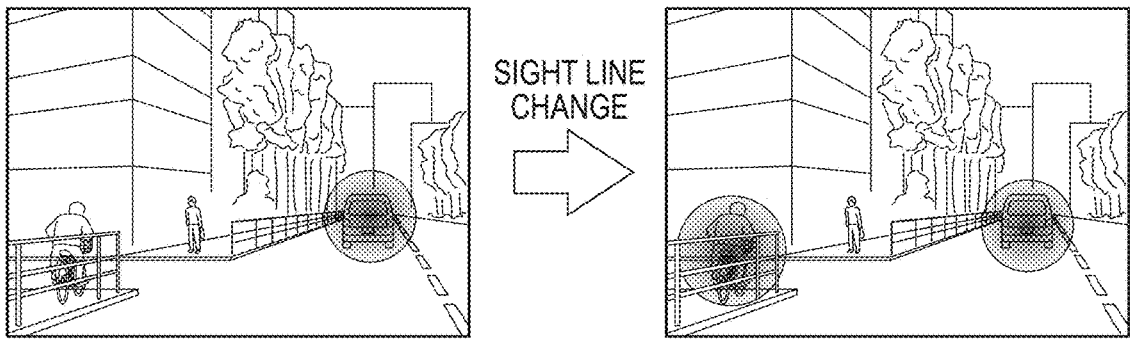

FIG. 8A shows a situation in which on the periphery of the self-vehicle, a bicycle that has traveled on a sidewalk moves to the lane to avoid a pedestrian on the sidewalk. FIG. 8B shows an example of a notification made when performing indirect guidance immediately before the situation. This intends to change the sight line of the driver such that it is directed to the bicycle as well. FIG. 8C shows an example of a notification made when performing direct guidance. In this case, as compared to the sight line of the driver in FIG. 8B, the initial sight line is located at a position apart from the position of the bicycle.

Figure 9A:
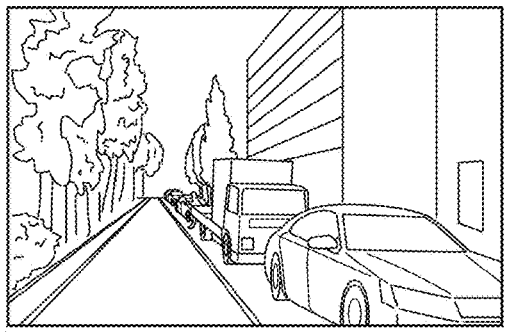
FIGS. 9A to 9C are views for explaining examples of direct guidance and indirect guidance according to an embodiment of the present invention.
Figure 9A:
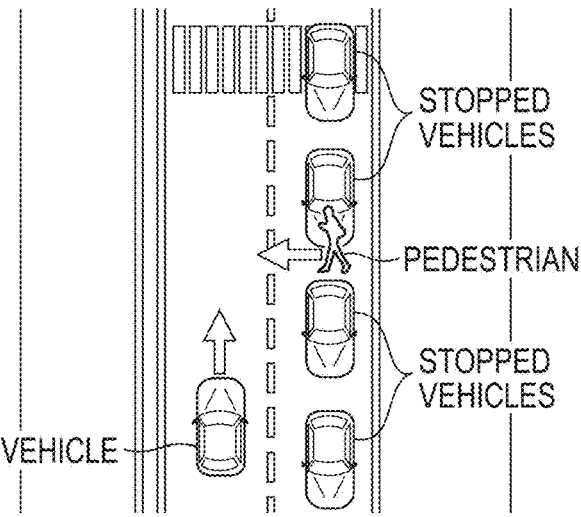
Figure 9B:
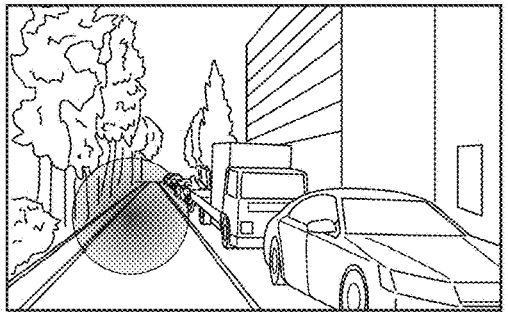
Figure 9B:
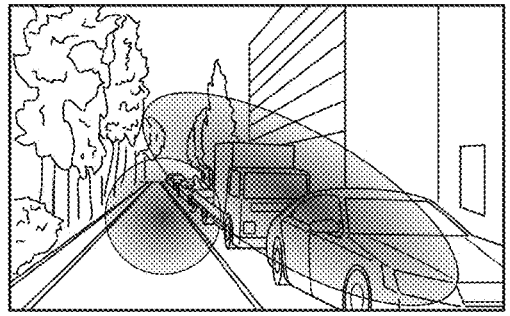
Figure 9C:
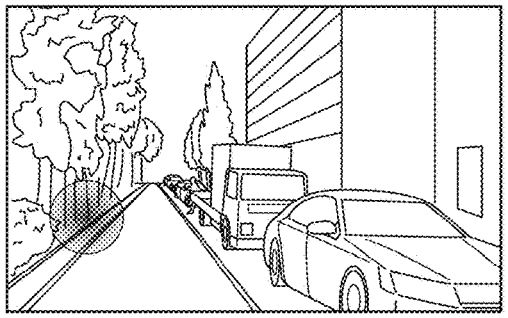
Figure 9C:
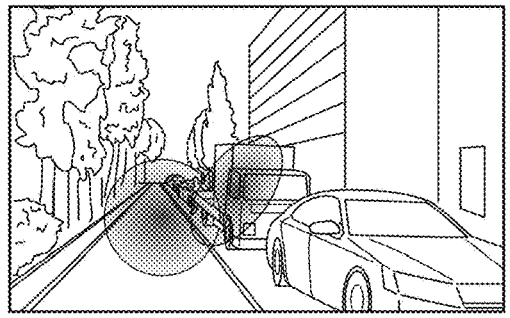

FIG. 9A shows a situation in which stopped vehicles are lined up due to congested traffic or the like on the lane opposite to the lane on which the self-vehicle is traveling, and a pedestrian exists between the stopped vehicles. FIG. 9B shows an example of a notification made when performing indirect guidance in this situation. This intends to change the sight line of the driver such that it includes the stopped vehicle side on the opposite lane. FIG. 9C shows an example of a notification made when performing direct guidance. In this case, as compared to the sight line of the driver in FIG. 9B, the initial sight line is located at a position apart from the positions of the stopped vehicles on the opposite lane.

The above-described notification contents are merely examples, and are not particularly limited. The notification contents used in the direct guidance and the indirect guidance may change in accordance with the situation. For example, in the direct guidance, the intensity of an utterance may be raised as compared to the indirect guidance. More specifically, the volume at the time of a notification may be increased, or the notification timing may be advanced. In addition, the utterance speed or tone of a notification message may be changed (the speed of speaking is increased, the way of speaking is changed, or the like).

As described above, in this embodiment, the contents to notify are switched in accordance with the positional relationship between the position of the sight line of the driver and the potential risk region or the region of the gazing point of the skilled driver. This makes it possible to perform appropriate driving support for the driver in consideration of the sight line of the driver and the peripheral environment of a road during traveling. In particular, a notification can be made to a degree that the driver does not feel that the notification is excessive.

Second Embodiment

As the second embodiment of the present invention, an embodiment in which driving support control according to the position of the sight line of a driver is performed will be described, in addition to the arrangement of the first embodiment. Note that a description of the same parts as in the first embodiment will be omitted, and only different parts will be described.

In the first embodiment, direct guidance and indirect guidance are switched in accordance with the distance between the sight line of the driver and the potential risk region or the region of the gazing point of the skilled driver. In the second embodiment, an embodiment in which the degree of driving support control is switched in accordance with the distance will be described.

As described above, examples of driving support control are lane maintenance control, lane departure suppression control (road departure suppression control), lane change control, preceding vehicle following control, collision reduction brake control, erroneous start suppression control, adjacent vehicle notification control, and preceding vehicle start notification control. Other examples of driving support control associated with the vehicle speed are vehicle speed maintenance control and acceleration/deceleration control.

In this embodiment, a threshold for a control parameter with which driving support control can be executed is switched in accordance with the distance (degree of deviation) between the sight line of the driver and the potential risk region or the region of the gazing point of the skilled driver. In other words, if the sight line of the driver is close to the position of the gazing point of the skilled driver, the range where the driving support control can be executed is made large. More specifically, concerning vehicle speed maintenance control, if the sight line of the driver is close to the position of the gazing point of the skilled driver, control is performed to maintain the vehicle speed at a higher speed.

[Processing Procedure]

Figure 10:
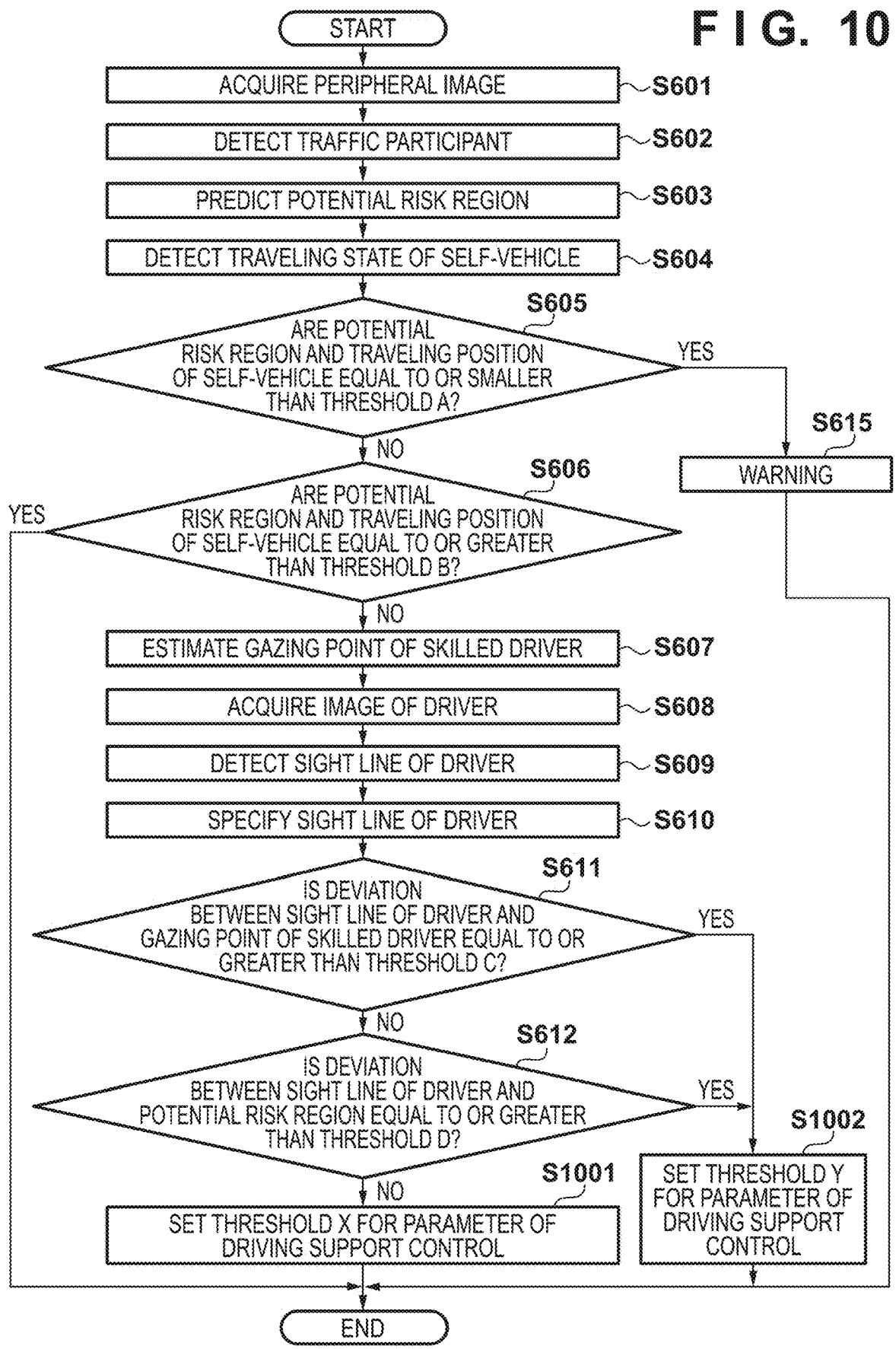
FIG. 10 is a flowchart of processing according to the second embodiment of the present invention.

FIG. 10 explains the processing procedure of control processing according to this embodiment. Each control process of this processing procedure is cooperatively performed by various kinds of ECUs and the like provided in a vehicle 1 as described above. To simplify the description, here, the main constituent of the processing is assumed to be a control unit 2 of the vehicle 1. For example, this processing may be started when the vehicle 1 starts driving support control. In addition, this processing may continuously be repeated during traveling of the vehicle 1. The same step numbers as in the processing shown in FIG. 6 described in the first embodiment denote the same steps, and a description thereof will be omitted.

In step S611, the control unit 2 determines whether the deviation of the distance between the gazing point of the skilled driver estimated in step S607 and the sight line of the driver specified in step S610 is equal to or larger than a predetermined threshold C. If it is determined that the distance is equal to or larger than the threshold C (YES in step S611), the process advances to step S1002. If it is determined that the distance is smaller than the threshold C (NO in step S611), the process advances to step S612.

In step S612, the control unit 2 determines whether the deviation of the distance between the potential risk region predicted in step S603 and the sight line of the driver specified in step S610 is equal to or larger than a predetermined threshold D. If it is determined that the distance is equal to or larger than the threshold D (YES in step S612), the process advances to step S1002. If it is determined that the distance is smaller than the threshold D (NO in step S612), the process advances to step S1001.

In step S1001, the control unit 2 sets a threshold X for the parameter of driving support control. Here, the threshold X is determined in advance for driving support control that can be executed by the vehicle 1. Then, the processing procedure is ended.

In step S1002, the control unit 2 sets a threshold Y for the parameter of driving support control. Here, the threshold Y is determined in advance for driving support control that can be executed by the vehicle 1. Note that the threshold Y has a limitation stricter than the threshold X. Then, the processing procedure is ended.

Note that the limit value switched as the threshold X or the threshold Y may not be switched for all driving support control processes executable by the vehicle 1 and may be switched only for some driving support control processes.

As described above, in this embodiment, the contents of driving support control to be executed are switched in accordance with the positional relationship between the position of the sight line of the driver and the potential risk region or the region of the gazing point of the skilled driver. This makes it possible to provide appropriate driving support to the driver in consideration of the sight line of the driver and the peripheral environment of a road during traveling.

Note that the arrangement of the first embodiment and the arrangement of the second embodiment are not exclusive, and both control processes may be performed.

Third Embodiment

In the above-described embodiments, a predetermined threshold is used when determining the distance (degree of deviation) between the position of the sight line of the driver and the potential risk region or the region of the gazing point of the skilled driver. As the third embodiment of the present invention, an embodiment in which the threshold used when determining the degree of deviation is switched in accordance with a driver will be described.

[Threshold Setting Processing]

Figure 11:
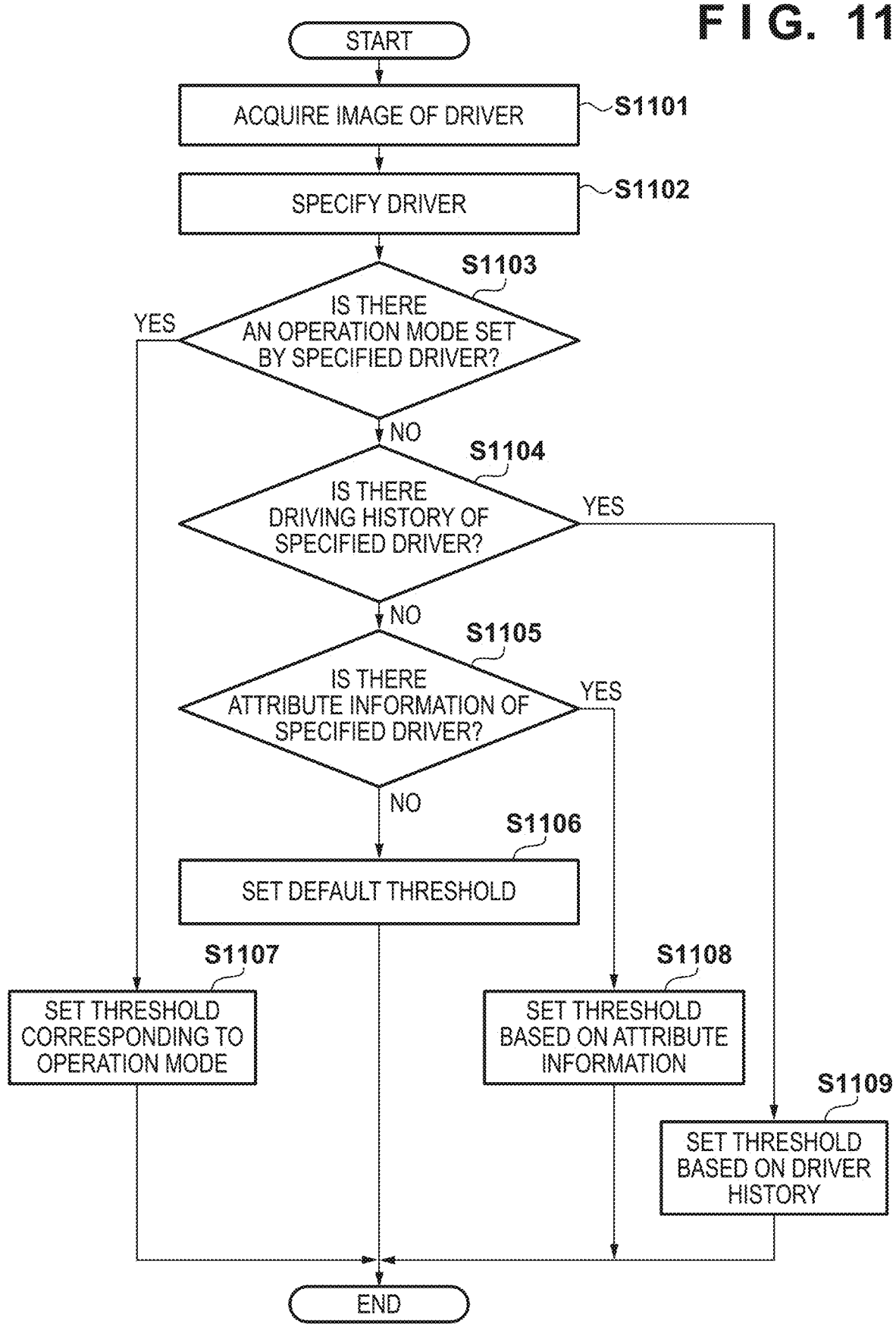
FIG. 11 is a flowchart of threshold setting processing according to the third embodiment of the present invention.

FIG. 11 explains the processing procedure of threshold setting according to this embodiment. Each control process of this processing procedure is cooperatively performed by various kinds of ECUs and the like provided in a vehicle 1 as described above. To simplify the description, here, the main constituent of the processing is assumed to be a control unit 2 of the vehicle 1. For example, this processing may be started when the vehicle 1 starts traveling.

In step S1101, the control unit 2 acquires an image of the driver of the vehicle 1 by the in-vehicle detection unit 50.

In step S1102, the control unit 2 specifies the driver based on the image of the driver acquired in step S1101. The specifying method here is not particularly limited, and, for example, matching processing with a face image registered in advance may be used.

In step S1103, the control unit 2 determines whether there is an operation mode set by the driver specified in step S1102. The operation mode here is an operation mode provided for driving support control of the vehicle 1 or the like. The contents of the operation mode are not particularly limited, and include, for example, an energy saving mode for suppressing energy consumption at the time of driving support and a mode in which brake control is performed such that an occupant can be on board comfortably. Each operation mode may be set using a display device 92 or the like provided in the vehicle 1. If a set operation mode exists (YES in step S1103), the process advances to step S1107. If a set operation mode does not exist (NO in step S1103), the process advances to step S1104.

In step S1104, the control unit 2 determines whether the information of the driving history of the driver specified in step S1102 is held. As for the driving history, operation contents are successively held in a storage device or the like at the time of driving of the vehicle 1. If a driving history exists (YES in step S1104), the process advances to step S1109. If a driving history does not exist (NO in step S1104), the process advances to step S1105. Note that if the data amount (for example, the traveling distance) of the driving history is equal to or smaller than a predetermined amount, or if a predetermined period has elapsed from the last driving, the driving history may be handled as absent.

In step S1105, the control unit 2 determines whether the attribute information of the driver specified in step S1102 is registered. Examples of the attribute information are the rank of a license and the age. These pieces of attribute information may be registered in advance using, for example, the display device 92 provided in the vehicle 1. If the attribute information is registered (YES in step S1105), the process advances to step S1108. If the attribute information is not registered (NO in step S1105), the process advances to step S1106.

In step S1106, the control unit 2 sets a default value determined in advance as a threshold to be used to determine the degree of deviation. Then, the processing procedure is ended.

In step S1107, the control unit 2 sets a threshold held in association with the set operation mode as a threshold to be used to determine the degree of deviation. The threshold corresponding to the operation mode is determined in advance and held. Then, the processing procedure is ended.

In step S1108, the control unit 2 sets a threshold based on the attribute information as a threshold to be used to determine the degree of deviation. The threshold based on the attribute information is determined in advance by a table or the like and held. Then, the processing procedure is ended.

In step S1109, the control unit 2 sets a threshold based on the driving history as a threshold to be used to determine the degree of deviation. The threshold based on the driving history may be set in accordance with, for example, an operation history of acceleration/deceleration (brake/accelerator) or steering control, or a driving technique determination result using the operation history. For example, the threshold may be set relatively moderate for a driver determined as having a driving technique of high level. Then, the processing procedure is ended.

Using the threshold set by the above-described processing, the processing shown in FIG. 6 or 10 is performed. Note that the order of determination in FIG. 11 is not limited to this, and the determination order (priority order of determination) may be changed.

As described above, according to this embodiment, in addition to the effects of the first and second embodiments, it is possible to switch the threshold to be used to determine the degree of deviation in accordance with the driver.

Summary of Embodiment

1. According to the above-described embodiment, there is provided a driving support apparatus (for example, 2) in a vehicle (for example, 1), comprising:
   an information acquisition unit (for example, 2, 41) configured to acquire peripheral information of the vehicle;
   a risk prediction unit (for example, 2) configured to predict a risk region on the periphery of the vehicle using the peripheral information;

a sight line specifying unit (for example, 2, 50) configured to specify a position of a sight line of a driver of the vehicle in the peripheral information; and a control unit (for example, 2) configured to switch driving support control based on a degree of deviation between the risk region predicted by the risk prediction unit and the position of the sight line specified by the sight line specifying unit.

According to this embodiment, it is possible to perform appropriate driving support for the driver in consideration of the sight line of the driver and the peripheral environment of a road during traveling.

2. In the above-described embodiment, the apparatus further comprises an estimation unit (for example, 2) configured to estimate the position of the sight line in the peripheral information using a learned model learned using data of the position of the sight line of the driver having a specific attribute at the time of driving, wherein the control unit further switches the driving support control based on the degree of deviation between the position of the sight line estimated by the estimation unit and the position of the sight line specified by the sight line specifying unit.

According to this embodiment, it is possible to perform appropriate driving support control based on the degree of deviation between the sight line of the driver and the position of the sight line estimated using the learned model learned using the data of the position of the sight line of the driver having a specific attribute at the time of driving.

3. In the above-described embodiment, the control unit switches contents of a notification to the driver based on the degree of deviation.

According to this embodiment, based on the degree of deviation of the sight line, it is possible to make a notification to a degree that the driver does not feel that the notification is excessive.

4. In the above-described embodiment, switching of the contents of the notification includes change of one of a volume, a notification timing, an utterance speed, and a tone.

According to this embodiment, it is possible to appropriately switch the notification contents for the driver.

5. In the above-described embodiment, switching of the contents of the notification includes change of words for directly notifying contents of a risk and words for indirectly notifying the contents of the risk.

According to this embodiment, it is possible to notify the driver of the contents of a risk by switching to direct or indirect words.

6. In the above-described embodiment, the contents of the notification include words used to guide the sight line of the driver to the risk region.

According to this embodiment, it is possible to guide the sight line of the driver to a more appropriate position.

7. In the above-described embodiment, the control unit switches a threshold for a control parameter of the driving support control based on the degree of deviation.

According to this embodiment, it is possible to provide more appropriate contents of driving support based on the degree of deviation of the sight line.

8. In the above-described embodiment, the apparatus further comprises a decision unit (for example, 2) configured to decide a threshold for the degree of deviation in accordance with information of the driver, wherein the control unit switches the driving support control using the threshold decided by the decision unit.

According to this embodiment, it is possible to control the threshold for the degree of deviation in accordance with the driver and provide driving support more suitable for the driver.

9. In the above-described embodiment, the information of the driver includes one of an operation mode of the vehicle set by the driver, a driving history of the driver, and attribute information of the driver.

According to this embodiment, it is possible to switch the driving support control according to information such as the attribute of the driver.

10. In the above-described embodiment, the apparatus further comprises a unit (for example, 2) configured to predict, using the peripheral information of the vehicle, a collision possibility between the vehicle and a target represented by the peripheral information, wherein the control unit switches the driving support control in accordance with the predicted collision possibility.

According to this embodiment, it is possible to switch the driving support control in accordance with the collision possibility.

11. In the above-described embodiment, if the predicted collision possibility exceeds a predetermined threshold, the control unit operates a collision safety device before collision.

According to this embodiment, it is possible to operate the collision safety device in accordance with the collision possibility.

12. According to the above-described embodiment, there is provided a control method of a vehicle (for example, 1), comprising:

acquiring peripheral information of the vehicle;

predicting a risk region on the periphery of the vehicle using the peripheral information;

specifying a position of a sight line of a driver of the vehicle in the peripheral information; and switching driving support control based on a degree of deviation between the risk region predicted in the predicting and the position of the sight line specified in the specifying.

According to this embodiment, it is possible to perform appropriate driving support for the driver in consideration of the sight line of the driver and the peripheral environment of a road during traveling.

13. The above-described embodiment can also be implemented by a non-transitory computer-readable storage medium storing a computer program. The non-transitory computer-readable storage medium stores a program configured to cause a computer (for example, 2) mounted in a vehicle (for example, 1) to function as:

an information acquisition unit configured to acquire peripheral information of the vehicle;

a risk prediction unit configured to predict a risk region on the periphery of the vehicle using the peripheral information;

a sight line specifying unit configured to specify a position of a sight line of a driver of the vehicle in the peripheral information; and a control unit configured to switch driving support control based on a degree of deviation between the risk region predicted by the risk prediction unit and the position of the sight line specified by the sight line specifying unit.

According to this embodiment, it is possible to perform appropriate driving support for the driver in consideration of the sight line of the driver and the peripheral environment of a road during traveling.

The invention is not limited to the foregoing embodiments, and various variations/changes are possible within the spirit of the invention.

What is claimed is:

1. A driving support apparatus in a vehicle, comprising:
an information acquisition unit configured to acquire peripheral information of the vehicle;
a risk prediction unit configured to predict a risk on a periphery of the vehicle using the peripheral information;
a specifying unit configured to specify a sight line of a driver of the vehicle; and
a control unit configured to switch, based on a comparison result of a threshold and a degree of deviation between a position where the predicted risk exists and the specified sight line, a notification of the predicted risk to the driver of the vehicle between a direct guidance in which content of the predicted risk is expressed in direct words and an indirect guidance in which content of the predicted risk is expressed in indirect words,
the direct words show information regarding a position where the predicted risk exists, the position being a position of a traffic participant, and
the indirect words show information regarding an attribute associated with the predicted risk, the attribute including at least one of an appearance, age, clothes, behavior, shape, color, size of a traffic participant.

2. The driving support apparatus according to claim 1, wherein
the direct guidance is different from the indirect guidance in at least one of a volume, a notification timing, an utterance speed, and a tone of the notification.

3. The driving support apparatus according to claim 1, wherein the notification is configured to prompt a driver of the vehicle to look at a position where the risk exists.

4. The driving support apparatus according to claim 1, wherein the control unit is configured to switch a threshold for a control parameter of a collision reduction brake control based on the degree of deviation.

5. The driving support apparatus according to claim 1, further comprising a decision unit configured to decide the threshold in accordance with information of the driver.

6. The driving support apparatus according to claim 1, further comprising an estimation unit configured to estimate a sight line of a virtual driver, who is not in the vehicle, using a learned model learned using data of a sight line of a driver,
wherein the control unit is configured to further switch the notification based on a degree of deviation between the specified sight line and the estimated sight line.

7. The driving support apparatus according to claim 1, wherein the control unit is configured to warn the driver when a distance between the position where the predicted risk exists and the vehicle is equal to or smaller than a first threshold.

8. The driving support apparatus according to claim 7, wherein the control unit is configured to perform the notification of the predicted risk when the distance between the position where the predicted risk exists and the vehicle is longer than the first threshold and is equal to or smaller than a second threshold.

9. The driving support apparatus according to claim 1, wherein in a case in which the risk prediction unit predicts as the risk that a bicycle avoids a parking vehicle which exists on a front side of the vehicle,
the direct words show information regarding the position of the bicycle as the traffic participant, and
the indirect words show information regarding the attribute of a rider on the bicycle.

10. The driving support apparatus according to claim 1, wherein in a case in which the risk prediction unit predicts as the risk that a bicycle avoids a pedestrian on a bicycle which exists on a front side of the vehicle,
the direct words show information regarding the position of the bicycle as the traffic participant, and
the indirect words show information regarding the attribute of the pedestrian.

11. The driving support apparatus according to claim 1, wherein in a case in which the risk prediction unit predicts as the risk that a pedestrian jumps out from between stopped vehicles which exist on a front side of the vehicle,
the direct words show information regarding the position of the pedestrian as the traffic participant, and
the indirect words show information regarding the attribute of the stopped vehicles.

12. A control method of a vehicle, comprising:
acquiring peripheral information of the vehicle;
predicting a risk on a periphery of the vehicle using the peripheral information;
specifying a sight line of a driver of the vehicle; and
switching, based on a comparison result of a threshold and a degree of deviation between a position where the predicted risk exists and the specified sight line, a notification of the predicted risk to the driver of the vehicle between a direct guidance in which content of the predicted risk is expressed in direct words and an indirect guidance in which content of the predicted risk is expressed in indirect words,
wherein the direct words show information regarding a position where the predicted risk exists, the position being a position of a traffic participant, and
the indirect words show information regarding an attribute associated with the predicted risk, the attribute including at least one of an appearance, age, clothes, behavior, shape, color, size of a traffic participant.

13. A driving support apparatus in a vehicle, comprising:
a sensor configured to detect peripheral state of the vehicle, and
a processor configured, by executing a program, to:
predict a risk on a periphery of the vehicle using the detected peripheral state;
specify a sight line of a driver of the vehicle; and
switch, based on a comparison result of a threshold and a degree of deviation between a position where the predicted risk exists and the specified sight line, a notification of the predicted risk to the driver of the vehicle between a first notification and a second notification,
wherein the first notification includes information regarding a position where the predicted risk exists, the position being a position of a traffic participant, and
the second notification includes information regarding an attribute associated with the predicted risk, the attribute including at least one of an appearance, age, clothes, behavior, shape, color, size of a traffic participant.

* * * * *